(12) United States Patent
Kusama et al.

(10) Patent No.: US 8,911,889 B2
(45) Date of Patent: Dec. 16, 2014

(54) BATTERY, VEHICLE, AND BATTERY-OPERATED EQUIPMENT

(75) Inventors: Kazuyuki Kusama, Nagoya (JP); Yoshiaki Kameda, Aichi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/260,963

(22) PCT Filed: Apr. 9, 2009

(86) PCT No.: PCT/JP2009/057255
§ 371 (c)(1),
(2), (4) Date: Sep. 29, 2011

(87) PCT Pub. No.: WO2010/116504
PCT Pub. Date: Oct. 14, 2010

(65) Prior Publication Data
US 2012/0021262 A1    Jan. 26, 2012

(51) Int. Cl.
*H01M 2/12* (2006.01)
*H01M 2/00* (2006.01)
*H01M 2/04* (2006.01)
*H01M 10/052* (2010.01)

(52) U.S. Cl.
CPC ......... *H01M 2/1241* (2013.01); *Y02T 10/7011* (2013.01); *H01M 10/052* (2013.01)
USPC ............................................. 429/56; 429/53

(58) Field of Classification Search
CPC ..... H01M 2/1241; H01M 2/34; H01M 2/345; H01M 2/1223; H01M 2/1229; H01M 2/1205
USPC .................................................... 429/56, 53
See application file for complete search history.

(56) References Cited

U.S. PATENT DOCUMENTS

| 7,527,891 B2* | 5/2009 | Janmey | 429/56 |
| 8,263,242 B2* | 9/2012 | Yebka et al. | 429/56 |

FOREIGN PATENT DOCUMENTS

| JP | 5-84024 | 11/1993 | | |
| JP | 2002-8615 | 1/2002 | | |
| JP | 2002-008615 | * 1/2002 | ............. | H01M 2/12 |
| JP | 2002-329485 | * 11/2002 | ............. | H01M 2/04 |
| JP | 2002-367583 | 12/2002 | | |
| JP | 2005-135873 | 5/2005 | | |
| JP | 2006-216435 | 8/2006 | | |
| JP | 2006-351234 | 12/2006 | | |

OTHER PUBLICATIONS

International Search Report in International Application No. PCT/JP2009/057255; Mailing Date: Jun. 23, 2009.

\* cited by examiner

*Primary Examiner* — Barbara Gilliam
*Assistant Examiner* — Angela Martin
(74) *Attorney, Agent, or Firm* — Finnegan, Henderson, Farabow, Garrett & Dunner, LLP

(57) ABSTRACT

A lithium secondary battery is equipped with a non-recovering safety valve comprising a valve, which ruptures when the valve opens, and a valve surrounding part that surrounds the valve. The safety valve is further disposed in the valve surrounding part, and has an anti-scattering means that prevents shards, which are produced by the valve rupturing when the valve opens, from scattering outside the battery. The anti-scattering means constitutes an anti-fragmentation part of a form that prevents shards from fragmenting from the valve surrounding part.

12 Claims, 20 Drawing Sheets

BATTERY, VEHICLE, AND BATTERY-OPERATED EQUIPMENT

CROSS-REFERENCE TO RELATED APPLICATIONS

This application is a national phase application of International Application No. PCT/JP2009/057255, filed Apr. 9, 2009, the contents of which are incorporated herein by reference.

TECHNICAL FIELD

The present invention relates to a battery including a safety valve and, in particular, to a battery including a non-recovering safety valve having a valve part designed to rupture or cleave for valve opening and a valve surrounding part provided around this valve part. The present invention also relates to a vehicle provided with such battery and a battery-operated equipment provided with such battery.

BACKGROUND ART

Heretofore, there are widely known batteries each including a safety valve configured to open when the internal pressure of a battery exceeds a predetermined pressure to thereby promptly release internal gas to the outside of the battery. One of such safety valves is a non-recovering safety valve including a valve part configured to rupture or cleave when the valve opens and a valve surrounding part provided around this valve part, as disclosed in Patent Documents 1 to 4, for example.

As shown in FIGS. 16 to 18, for instance, a safety valve 917 is provided in a case lid 913 of a battery case constituting a battery 900. This safety valve 917 consists of a valve part 917e designed to rupture or cleave when the valve opens and a valve surrounding part 917f provided around this valve part 917e. The valve part 917e is a thin sheet formed with a V-section groove portion 917ev having a predetermined pattern. The valve surrounding part 917f has a ring shape surrounding the valve part 917e and is thicker than the valve part 917e.

The above safety valve 917 operates to open when the internal pressure of the battery reaches a predetermined pressure (see FIGS. 19 and 20). Specifically, when the internal pressure reaches the predetermined pressure, the valve part 917e starts to rupture or cleave from the groove portion 917ev, thus releasing internal gas to the outside of the battery. At that time, the valve part 917e cleaves upward.

RELATED ART DOCUMENTS

Patent Documents

Patent Document 1: JP 2005-135873 A
Patent Document 2: JP 2002-367583 A
Patent Document 3: JP 2006-216435 A
Patent Document 4: JP 2006-351234 A

DISCLOSURE OF THE INVENTION

Problems to be Solved by the Invention

In the above battery 900, broken portions of the valve part 917 when opened may be fragmented or broken apart from the valve surrounding part 917f and scatter as fragmented broken-portions (fragments) 917ez to the outside of the battery 900. In this case, the scattering fragments 917ez may cause such defects as breakage of surrounding components for example when the scattering fragments 917ez touch other batteries present around the battery 900, causing short circuit. In particular, in a battery assembly consisting of a plurality of the batteries 900 connected to each other, the batteries 900 are arranged in line. Accordingly, if the fragments 917ez scatter to the outside of the battery 900 when the valve opens, a short circuit may be established in an adjacent battery 900 alone or between adjacent batteries 900.

The present invention has been made in view of the circumstances and has a purpose to provide a battery including a non-recovering safety valve including a valve part designed to rupture for opening and a valve surrounding part provided around the valve part, the battery being adapted to prevent broken portions of the valve part ruptured when the valve opens from scattering to the outside of the battery. Further, another purpose is to provide a vehicle including such a battery and a battery-operated equipment including such a battery.

Means of Solving the Problems

To achieve the above purpose, one aspect of the invention provides battery comprising a non-recovering safety valve including a valve part configured to be ruptured when the valve opens and a valve surrounding part provided around the valve part, the battery comprising anti-scattering means provided in the valve surrounding part to constitute a part of the safety valve and configured to prevent a broken portion generated by rapture of the valve part when opened from scattering to outside of the battery.

The above battery includes the anti-scattering means to prevent the broken portion of the valve part ruptured when the valve opens from scattering to the outside of the battery. Accordingly, the broken portion of the valve part ruptured when the valve opens can be prevented from scattering to the outside of the battery. This can avoid such defects as breakage of surrounding components due to the scattering broken portion. For example, it is possible to prevent a short circuit in batteries present around the subject battery due to the broken portion scattering from the subject battery. In addition, since this anti-scattering means is placed in the valve surrounding part to constitute a part of the safety valve, it does not decrease the opening area of the valve part when opened and can more reduce the size of the entire safety valve as compared with a configuration that for example a safety valve is externally covered with a large cap. Thus, the battery can be reduced in size.

In the above battery, preferably, the anti-scattering means includes an anti-fragmentation part to prevent the broken portion from fragmenting from the valve surrounding part when the valve opens, the anti-fragmentation part being configured to restrict deformation of the broken portion by contact therewith to prevent the broken portion from fragmenting from the valve surrounding part.

In the above battery, the anti-scattering means includes the anti-fragmentation part to prevent the broken portions from breaking apart from the valve surrounding part when the valve opens. This anti-fragmentation part is configured so that the broken portions come into contact therewith at the valve opening time to restrict deformation of the broken portions, thereby preventing the broken portions from breaking apart from the valve surrounding part. Consequently, the broken portions of the ruptured valve part when opened can be prevented from scattering to the outside of the battery, whereby preventing such defects as breakage of the peripheral members due to the scattering broken portions.

In the above battery, preferably, the anti-scattering means includes a scattering-range restricting part to restrict a scattering range of a fragmented broken-portion of the broken portion fragmented from the valve surrounding part when the valve opens, the scattering-range restricting part being placed on a scattering path of the fragmented broken-portion and configured to prevent the fragmented broken-portion from scattering to outside of the scattering-range restricting part itself.

In the above battery, the anti-scattering means includes the scattering-range restricting part to restrict a scattering range of the fragmented broken-portion fragmented or broken apart from the valve surrounding part when the valve opens. This scattering-range restricting part is placed on the scattering path of the fragmented broken-portion and configured to prevent the fragmented broken-portion from scattering to the outside of the restricting part itself. Accordingly, the broken portion of the valve part ruptured when opened can be prevented from scattering to the outside of the battery, which can avoid such defects as breakage the surrounding components due to the scattering broken portion (the fragmented broken-portion).

In one of the above batteries, preferably, the anti-scattering means is integrally formed with the valve surrounding part.

In the above battery, the anti-scattering means is integrally formed with the valve surrounding part. This configuration can achieve a reduction in the number of components of the battery and also a reduction in the number of steps for producing the battery, as compared with a configuration that an anti-scattering means is provided separately from a valve surrounding part. Thus, the battery can be produced at low costs.

Further, the above battery preferably includes the battery case including a case body having an opening and housing a power generating element and a case lid to close the opening of this case body, the valve part, the valve surrounding part, and the anti-scattering means are integrally formed with the case lid.

The number of components of the battery can be further reduced and also the number of steps for producing the battery can be further reduced. Accordingly, the battery can be produced at lower costs.

Another aspect of the invention provides a vehicle equipped with one of the aforementioned batteries, the vehicle using electric energy of this battery as all or part of a power source.

The above battery can prevent the occurrence of such defects as breakage of the surrounding components due to the broken portion scattering when the valve opens. Consequently, reliability of a vehicle mounting this battery can be enhanced.

Note that the "vehicle" may include an electric vehicle, a hybrid electric vehicle, a plug-in hybrid electric vehicle, a hybrid electric railroad vehicle, a fork lift, an electric power assisted bicycle, and an electric scooter.

Further, another aspect of the invention provides a battery-operated equipment equipped with one of the aforementioned batteries, the device using this energy as at least one of energy sources.

The above battery can prevent the occurrence of such defects as breakage of the peripheral members due to the broken portion scattering when the valve opens. Consequently, reliability of a battery-operated equipment mounting this battery can be enhanced.

Note that the "battery mounting device" may include various home electric appliances, office equipment, industrial equipment, etc. such as a personal computer, a cellular phone, a battery-operated electric tool, and an uninterruptible power supply system.

Figure 1:
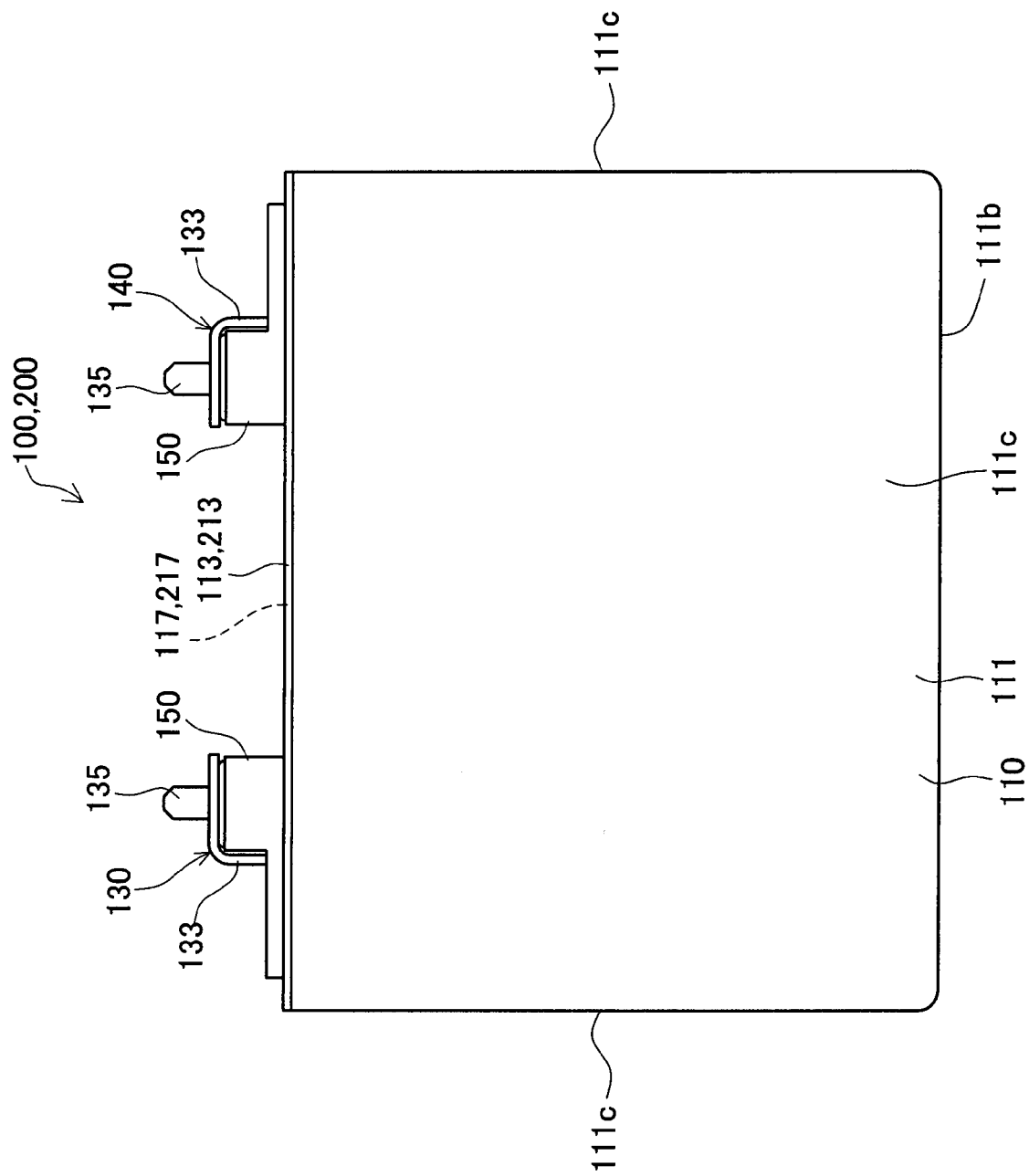
FIG. 1 is a side view of a lithium secondary battery in a first embodiment.

DESCRIPTION OF THE REFERENCE SIGNS 1100, 200 Lithium secondary battery (Battery)
110 Battery case 111 Case body
113, 213 Case lid
117, 217 Safety valve
117e Valve part
117ev Groove portion
117ex Ruptured portion
117exn Root portion
117ez Fragmented broken-portion (fragment)
117f, 217f Valve surrounding portion
117g Anti-fragmentation protruding wall (Anti-fragmentation part, Anti-scattering means)
217g Scattering-range restricting cap part (Anti-scattering restriction part, Anti-scattering means)
217g1 Side wall
120 Electrode body
125 Insulating film cover
130 Positive electrode terminal member (Electrode terminal member)
140 Negative electrode terminal member (Electrode terminal member)
700 Vehicle
710 Battery assembly (Battery)
800 Hammer drill (Battery mounting device)
810 Battery pack (Battery)

MODE FOR CARRYING OUT THE INVENTION

Embodiment 1

Figure 2:
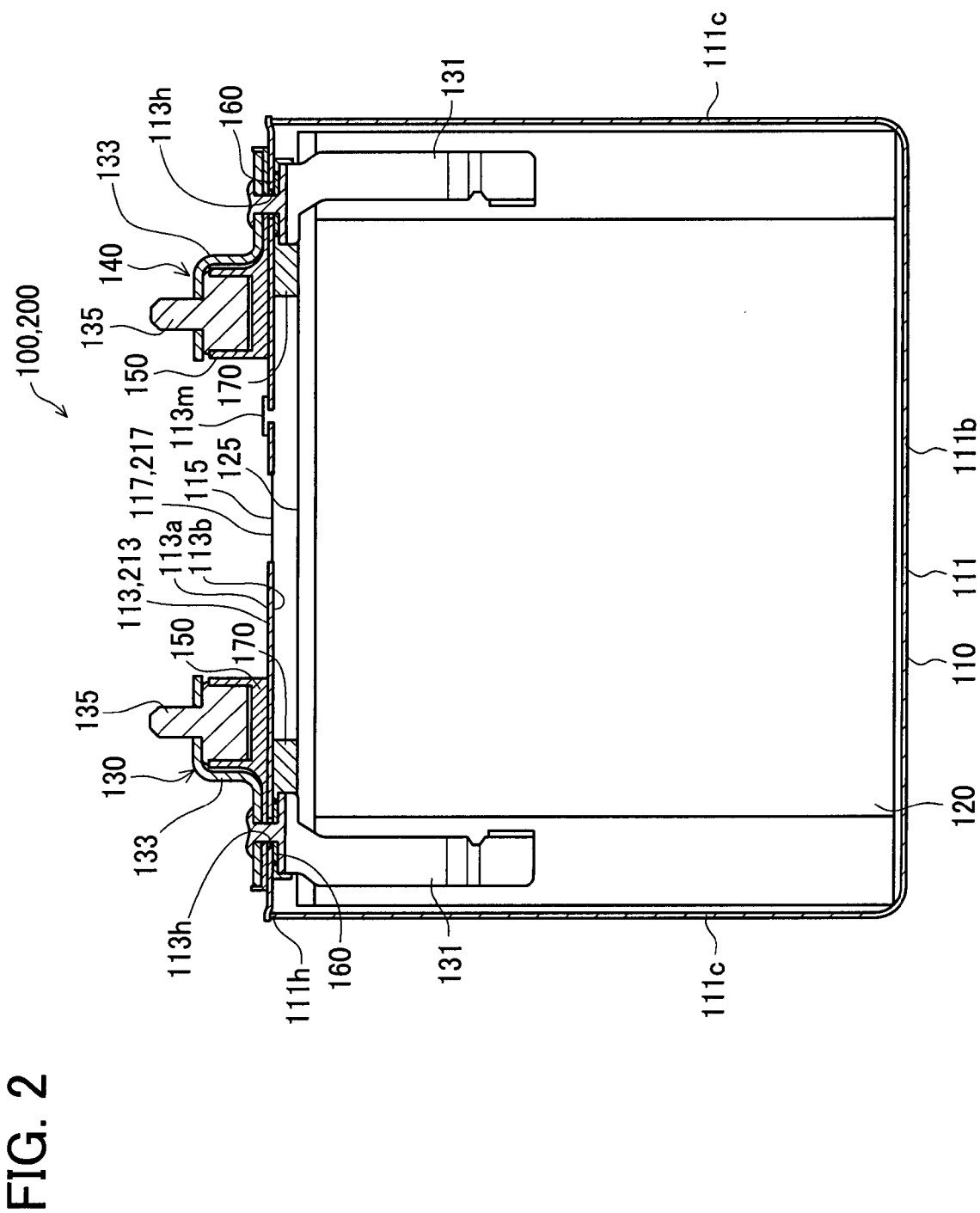
FIG. 2 is a longitudinal cross sectional view of the lithium secondary battery of the first embodiment.
Figure 3:
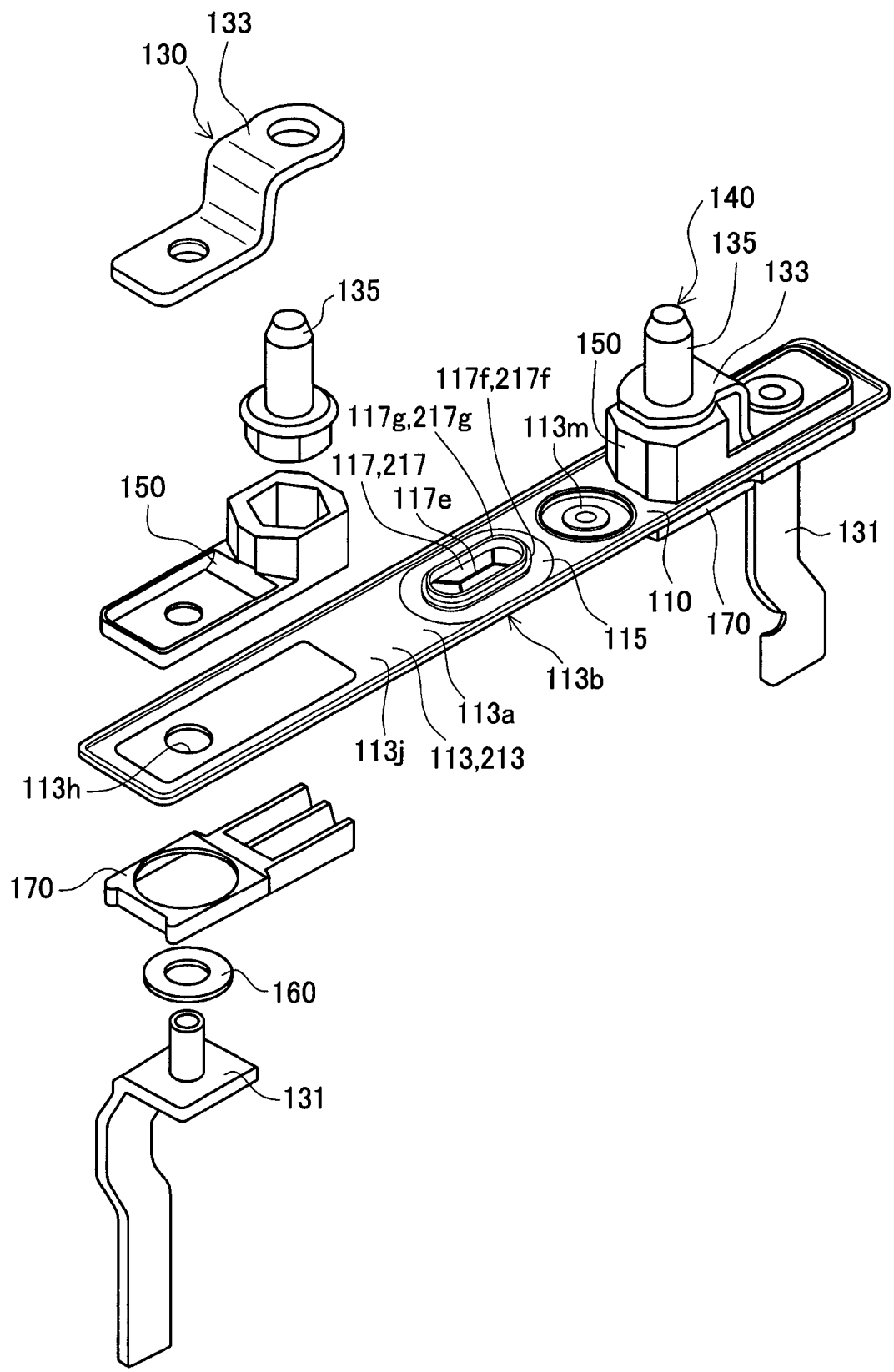
FIG. 3 is an exploded perspective view showing a case lid, electrode terminals, and insulating members of the lithium secondary battery of the first embodiment.
Figure 4:
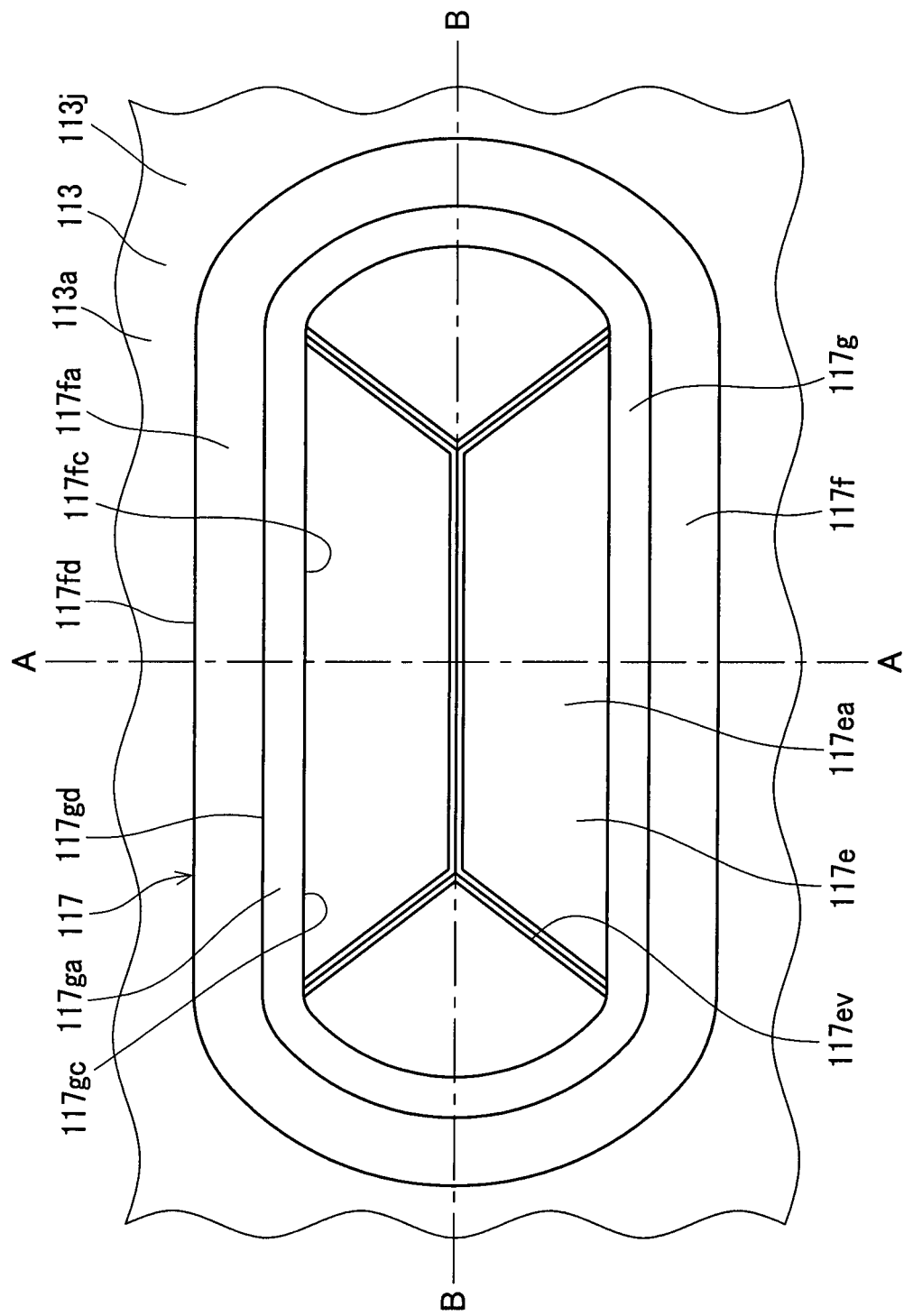
FIG. 4 is an enlarged plan view showing a safety valve and its vicinity in the lithium secondary battery of the first embodiment.
Figure 5:
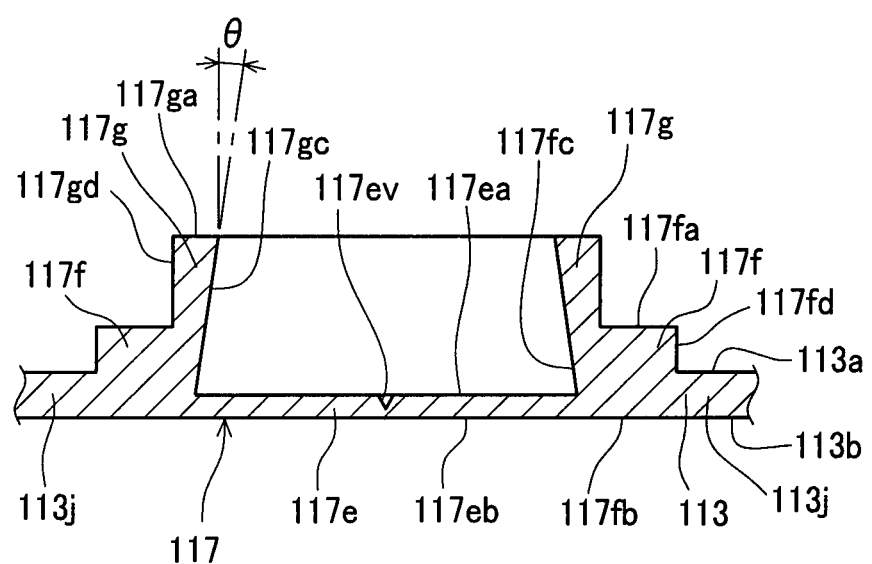
FIG. 5 is a cross sectional view of the safety valve of the lithium secondary battery of the first embodiment, taken along a line A-A in FIG. 4.
Figure 6:
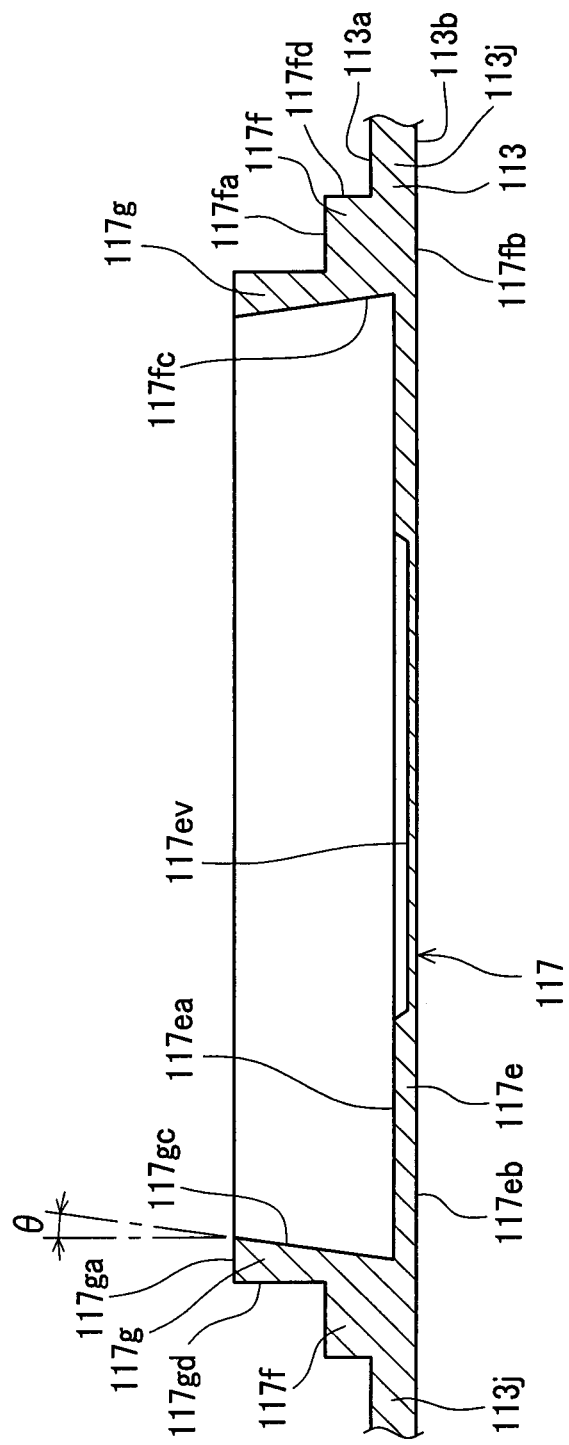
FIG. 6 is a cross sectional view of the safety valve of the lithium secondary battery of the first embodiment, taken along a line B-B in FIG. 4.

A detailed description of a preferred embodiment of the present invention will now be given referring to the accompanying drawings. FIG. 1 is a side view of a lithium secondary battery (a battery) 100 of a first embodiment and FIG. 2 is a longitudinal cross sectional view of the lithium secondary battery. FIG. 3 shows a case lid 113, electrode terminal members 130 and 140, and insulating members 150, 160, and 170, all of which constitute the lithium secondary battery 100. FIGS. 4 to 6 show the details of a safety valve 117 provided in the lithium secondary battery 100. The following explanations will be made so that respective upper sides in FIGS. 1 to 3, 5, and 6 are referred to as an upper side of the lithium secondary battery 100 and lower sides are referred to as a lower side of the same.

This lithium secondary battery 100 is a rectangular battery which will be mounted in vehicles such as a hybrid electric vehicle and an electric vehicle or battery-operated equipment such as a hammer drill. The lithium secondary battery 100 includes a rectangular battery case 110, an electrode body (a power generating element) 120 housed in this case 110, an insulating film cover 125 enclosing the electrode body 120 and housed in the case 110, two electrode terminal members 130 and 140 supported on the case 110, and three types of insulating members 150, 160, and 170 for insulating the case 110 from the electrode terminal members 130 and 140. Further, an electrolyte is contained in the case 110.

The battery case 110 is made of metal (pure aluminum) and has a rectangular parallelepiped shape. This case 110 includes a case body 111 of a box-like shape having an opening only in its upper end and housing the electrode body 120 mentioned later, and a rectangular plate-like case lid 113 welded to the case body 111 to close its opening 111h.

The case body 111 includes a rectangular plate-like bottom wall 111b opposed to the lid 113, and four side walls 111c that join the lid 113 and the bottom wall 111b.

The case lid 113 has a rectangular plate-like shape including an upper surface 113a and an under surface 113b and is formed, in predetermined positions near both ends in its longitudinal direction (a horizontal direction in FIGS. 1 to 3), with terminal insertion holes 113h each being configured as a circular hole extending through the lid 113. In one of the holes 113h, i.e., a left one in FIGS. 2 and 3, the positive electrode terminal member 130 mentioned later is inserted. In the other hole 113h, i.e., a right one in FIGS. 2 and 3, the negative electrode terminal member 140 is inserted.

The case lid 113 is provided, at the center of its longitudinal direction, with a non-recovering safety valve 117 having an elliptic shape in plan view. This safety valve 117 is made integrally with the lid 113 to constitute a part of the lid 113. The safety valve 117 includes a valve part 117e designed to rupture or cleave for valve opening, a valve surrounding part 117f provided around the valve part 117e, and an anti-fragmentation protruding wall (an anti-fragmentation part) 117g provided in the valve surrounding part 117f (see FIGS. 3 to 6). Those valve part 117e, valve surrounding part 117f, and anti-fragmentation protruding wall 117g are integrally formed. The anti-fragmentation protruding wall 117g corresponds to an anti-scattering means of the invention.

The valve part 117e is formed of a thin sheet (with a thickness of 110±30 µm) having an upper surface 117ea and an under surface 117eb and an elliptic shape in plan view (see FIGS. 4 to 6). This valve part 117e is formed with a V-section groove portion 117ev having a predetermined pattern (like two Y-like figures symmetrically connected in plan view). In the valve part 117e, the thickness of this groove portion 117ev is as particularly thin as 45±30 µm (see FIGS. 5 and 6). Therefore, this valve part 117e will start to rupture or cleave from the groove portion 117ev when the valve opens, so that the valve part 117e is split into four broken portions 117ex (see FIGS. 7 and 8).

The valve surrounding part 117f has a ring shape including an upper surface 117fa, an under surface 117fb, an inner peripheral surface 117fc, and an outer peripheral surface 117fd (see FIGS. 4 to 6). Each of the inner peripheral surface 117fc and the outer peripheral surface 117fd is of an elliptic shape in plan view of the safety valve 117. The under surface 117fb of the valve surrounding part 117f and an under surface 117eb of the valve part 117e are continuous and flush with each other, constituting a part of the under surface 113b of the case lid 113. The valve surrounding part 117f is designed with a thickness of 1.0±0.28 mm, which is thicker than the thickness of the valve part 117e (see FIGS. 5 and 6). In the case lid 113, the thickness of a lid main part 113j located radially outside the valve surrounding part 117f is 0.5±0.25 mm. The valve surrounding part 117f is therefore thicker than this lid main part 113j.

The anti-fragmentation protruding wall 117g has a ring shape including an upper surface 117ga, an inner peripheral surface 117gc, and an outer peripheral surface 117gd (see FIGS. 4 to 6). Each of the inner peripheral surface 117gc and the outer peripheral surface 117gd has an elliptic shape in plan view of the safety valve 117. The anti-fragmentation protruding wall 117g is formed to protrude upward from the valve surrounding part 117f so that the height of the protruding wall 117g is 1.5±0.25 mm (see FIGS. 5 and 6). The inner peripheral surface 117gc of this protruding wall 117g and the inner peripheral surface 117fc of the valve surrounding part 117f are continuous and flush with each other. On the other hand, the outer peripheral surface 117gd of the protruding wall 117g is located radially inside the outer peripheral surface 117fd of the valve surrounding part 117f.

The outer peripheral surface 117gd of the protruding wall 117g and the outer peripheral surface 117fd of the valve surrounding part 117f are perpendicular to the upper surface 113a and the under surface 113b of the case lid 113, the upper surface 117*ea* and the under surface 117*eb* of the valve part 117*e*, and the upper surface 117*fa* and the under surface 117*fb* of the valve surrounding part 117*f*. On the other hand, the inner peripheral surface 117*gc* of the protruding wall 117*g* and the inner peripheral surface 117*fc* of the valve surrounding part 117*f* are slanted radially more inward on an upper side than on a lower side, with respect to those outer peripheral surfaces 117*gd* and 117*fd*. In other words, the inner peripheral surfaces 117*gc* and 117*fc* are respectively at an angle θ (10±5° in this embodiment) with the outer peripheral surfaces 117*gd* and 117*fd*.

The anti-fragmentation protruding wall 117*g* functions to prevent the broken portions 117*ex* of the valve part 117*e* ruptured when opened from scattering to the outside of the lithium secondary battery 100 as mentioned later (see FIGS. 7 and 8). To be concrete, the protruding wall 117*g* serves to prevent the broken portions 117*ex* from fragmenting or breaking apart from the valve surrounding part 117*f* when the valve opens, as mentioned later. More specifically, the protruding wall 117*g* restricts deformation of the broken portions 117*ex* by contact with them, thereby preventing fragmentation of the broken portions 117*ex* from the valve surrounding part 117*f*.

Figure 7:
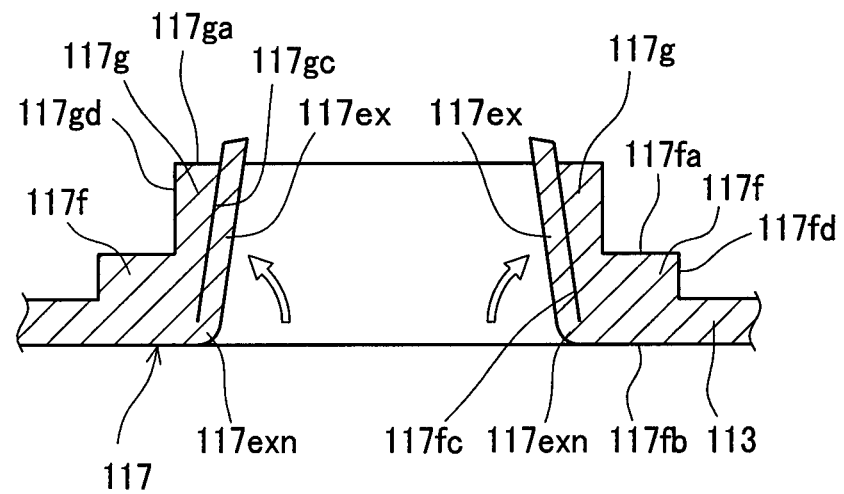
FIG. 7 is an explanatory view for the lithium secondary battery of the first embodiment, showing an opened state of the safety valve, in the cross sectional view along the line A-A in FIG. 4.
Figure 8:
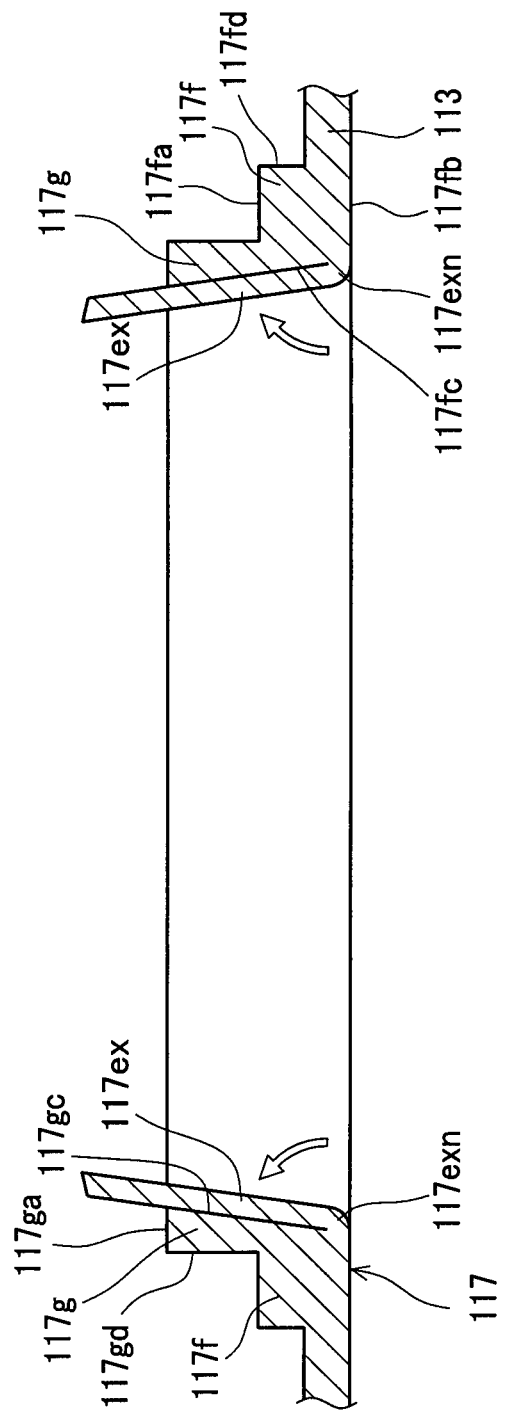
FIG. 8 is an explanatory view for the lithium secondary battery of the first embodiment, showing the opened state of the safety valve, in the cross sectional view along the line B-B in FIG. 4.

Such a safety valve 117 operates to open when the internal pressure of the battery case 110 reaches a predetermined pressure (see FIGS. 7 and 8). Specifically, when the internal pressure reaches the predetermined pressure, the valve part 117*e* starts to rupture or cleave from the groove portion 117*ev*, thus releasing internal gas to the outside of the battery. At the time of rupture of this valve part 117*e*, the valve part 117*e* is cleaved upward and split into four broken portions 117*ex*.

Each broken portion 117*ex* comes into contact with the inner peripheral surface protruding wall 117*gc* of the protruding wall 117*g*. As mentioned above, the inner peripheral surface 117*gc* of the protruding wall 117*gc* is slanted radially inward so that its upper side is located more inward. This configuration restricts (restrains) deformation of the root portion 117*exn* of each broken portion 117*ex* more than a conventional configuration. It is therefore possible to prevent each broken portion 117*ex* from fragmenting or breaking apart from the valve surrounding part 117*f*. Consequently, the broken portions 117*ex* generated when the valve opens are less likely to scatter to the outside of the lithium secondary battery 100.

In addition, on the safety valve 117, there is adhered a resin film 115 made of PPS resin and in a thin film form (see FIG. 3). The valve part 117*e* of the safety valve 117 is thin and, in particular, the groove portion 117*ev* is thinner, which may be broken with a hole caused by oxidation. However, the resin film 115 formed on the safety valve 117 externally protects the safety valve 117 to effectively prevent breakage of the safety valve 117. In FIGS. 4 to 8, the resin film 115 is not illustrated.

A liquid inlet 113*m* is provided in a predetermined location of the case lid 113, on the near side to the negative electrode terminal member 140 relative to the center of the lid 113 in its longitudinal direction, to allow pouring of an electrolyte into the battery case 110.

As shown in FIG. 2, the battery case 110 internally houses the electrode body 120 of a wound type having an elliptic cross section perpendicular to its own axial direction (a horizontal direction in FIG. 2), the electrode body 120 being oriented sideways, that is, the axial direction of the electrode body 120 is perpendicular to two side walls 111*c* of the case body 111. Both ends of this electrode body 120 in the axial direction are respectively connected to an element connecting member 131 of the positive electrode terminal member 130 and an element connecting member 131 of the negative electrode terminal member 140.

This electrode body 120 is configured such that a positive current collector foil and a negative current collector foil are wound together in overlapping fashion while interposing a separator therebetween and then compressed into a flattened form. The positive current collector foil has a positive current collector body made of a long aluminum foil. On both surfaces of this positive current collector body, there are respectively formed positive active material layers including a positive active material. The negative current collector foil has a negative current collector body made of a long copper foil. On both surfaces of this negative current collector body, there are respectively formed negative active material layers including a negative active material. The separator is made of a porous polypropylene resin sheet.

This electrode body 120 is entirely enclosed, excepting its upper end, by an insulating film cover 125 folded in a box-like shape (a bottom-closed rectangular tubular shape) that is open only in its upper end and welded at predetermined portions. This cover 125 is interposed between the electrode body 120 and the battery case 110 (the case body 111) to insulate between them.

The positive electrode terminal member 130 and the negative electrode terminal member 140 will be explained below (see FIGS. 1 to 3). Since those terminal members 130 and 140 have substantially the same configuration, their identical or similar components are explained with common reference signs between the terminal members 130 and 140.

The positive electrode terminal member 130 is electrically and mechanically connected to the positive current collector foil of the electrode body 120 inside the battery case 110, while the terminal member 130 extends out of the battery case 110 (above the case lid 113) through the insertion hole 113*h* formed in the case 110 (the lid 113). The negative electrode terminal member 140 is electrically and mechanically connected to the negative current collector foil of the electrode body 120 inside the battery case 110, while the terminal member 140 extends out of the case 110 (above the lid 113) through the insertion hole 113*h* formed in the case 110 (the lid 113).

Each of the electrode terminal members 130 and 140 includes the element connecting member 131 extending out of the battery case 110 through the insertion hole 113*h* to the upper side of the case lid 113, an externally placed terminal member 133 having a Z shape (stepwise) connected to the connecting member 131 and located on the lid 113, and a fastening member 135 connected to the terminal member 133 and located on the lid 113. Those connecting member 131, externally placed terminal member 133, and fastening member 135 are each made of metal. The connecting member 131 of the positive electrode terminal member 130 is made of pure aluminum in consideration of being welded to the metal foil (aluminum foil) of the positive current collector foil of the electrode body 120. The connecting member 131 of the negative electrode terminal member 140 is made of pure copper in consideration of being welded to the metal foil (copper foil) of the negative current collector foil of the electrode body 120.

To the case lid 113, the external insulating members 150 as well as the electrode terminal members 130 and 140 are fixed. These external insulating members 150 are mainly located outside of the battery case 110 (on the case lid 113) and between the electrode terminal member 130 or 140 and the lid 113 to prevent a short circuit due to contact between the electrode terminal members 130 and 140 and the lid 113. The external insulating members 150 are made of resin, concretely, PPS resin.

Further, seal rubber elements 160 as well as the electrode terminal members 130 and 140 are fixed to the case lid 113. Each rubber element 160 is made of resin. These rubber elements 160 are placed inside the battery case 110 and in a compressed state between the lid 113 and the connecting members 131 in a thickness direction. Each rubber element 160 has an annular plate-like shape in which the connecting member 131 is inserted. The seal rubber elements 160 provide insulation and sealing between the lid 113 and the connecting members 131.

In addition, internal insulating members 170 as well as the electrode terminal members 130 and 140 are fixed to the case lid 113. Each insulating member 170 is made of resin, concretely, PPS resin. Each insulating member 170 is located inside the battery case 110 and placed radially outside the seal rubber element 160 and between the lid 113 and the connecting member 131. Such configuration is able to establish insulation between the lid 113 and the connecting members 131 and also restrict the thickness of each seal rubber element 160 to a predetermined thickness. A part of the internal insulating member 170 is placed between the lid 113 and the electrode body 120 to make sure that the lid 113 is out of contact with the electrode body 120.

As explained above, the lithium secondary battery 100 of the first embodiment includes the anti-fragmentation protruding wall 117g to prevent the broken portions 117ex generated by rupture or cleavage of the valve part 117e when the safety valve 117 is opened from scattering to the outside of the lithium secondary battery 100. This protruding wall 117g has a function of preventing the broken portions 117ex from fragmenting or breaking apart from the valve surrounding part 117f when the valve opens. To be concrete, the protruding wall 117g allows the broken portions 117ex to come into contact therewith when the valve opens, thereby restricting deformation of the broken portions 117ex to prevent fragmentation of the broken portions 117ex from valve surrounding part 117f.

This makes it possible to prevent such defects as breakage of the surrounding components due to the broken portions 117ex generated when the valve opens. Furthermore, the protruding wall 117g is provided in the valve surrounding part 117f of the safety valve 117 to constitute a part of the safety valve 117. Accordingly, the size of the entire safety valve 117 can be made small without a decrease in the opening area of the valve part 117e when opened, as compared with a configuration that for example an upper side of a safety valve 117 is covered with a large cap. Thus, the lithium secondary battery 100 can also be compact.

In the first embodiment, furthermore, the protruding wall 117g is integrally formed with the valve surrounding part 117f. As compared with a configuration that the protruding wall 117g is provided separately from the valve surrounding part 117f, the number of components of the lithium secondary battery 100 can be reduced and the number of steps of producing the lithium secondary battery 100 can also be reduced. As a result, the lithium secondary battery 100 can be provided at low costs.

A method of producing the aforementioned lithium secondary battery 100 will be described below.

The electrode body 120 and the element connecting members 131 are respectively prepared. The connecting member 131 for positive electrode and the connecting member 131 for negative electrode are welded respectively to both ends of the electrode body 120 in its axial direction. Thereafter, the seal rubber elements 160 are individually placed on the connecting members 131. The internal insulating members 170 are individually placed radially outside the seal rubber elements 160. Further, the case lid 113 separately formed is put on the internal insulating members 170. Successively, the external insulating members 150 are disposed on the lid 113 and, further thereon, the externally placed terminal members 133 and the fastening members 135 are placed. Then, those electrode body 120, electrode terminal members 130 and 140, lid 113, and insulating members 150, 160, and 170 are fixed to one another.

Next, the electrode body 120 is housed in the insulating film cover 125 and then they are inserted in the case body 111. Thereafter, the lid 113 is placed on the opening 111h of the case body 111 and the peripheral edge of the lid 113 is welded by laser to the open peripheral edge of the case body 111. An electrolyte is poured in the battery case 110 through the liquid inlet 113m of the lid 113 and then this inlet is sealed. As above, the lithium secondary battery 100 is completed.

Embodiment 2

Figure 9:
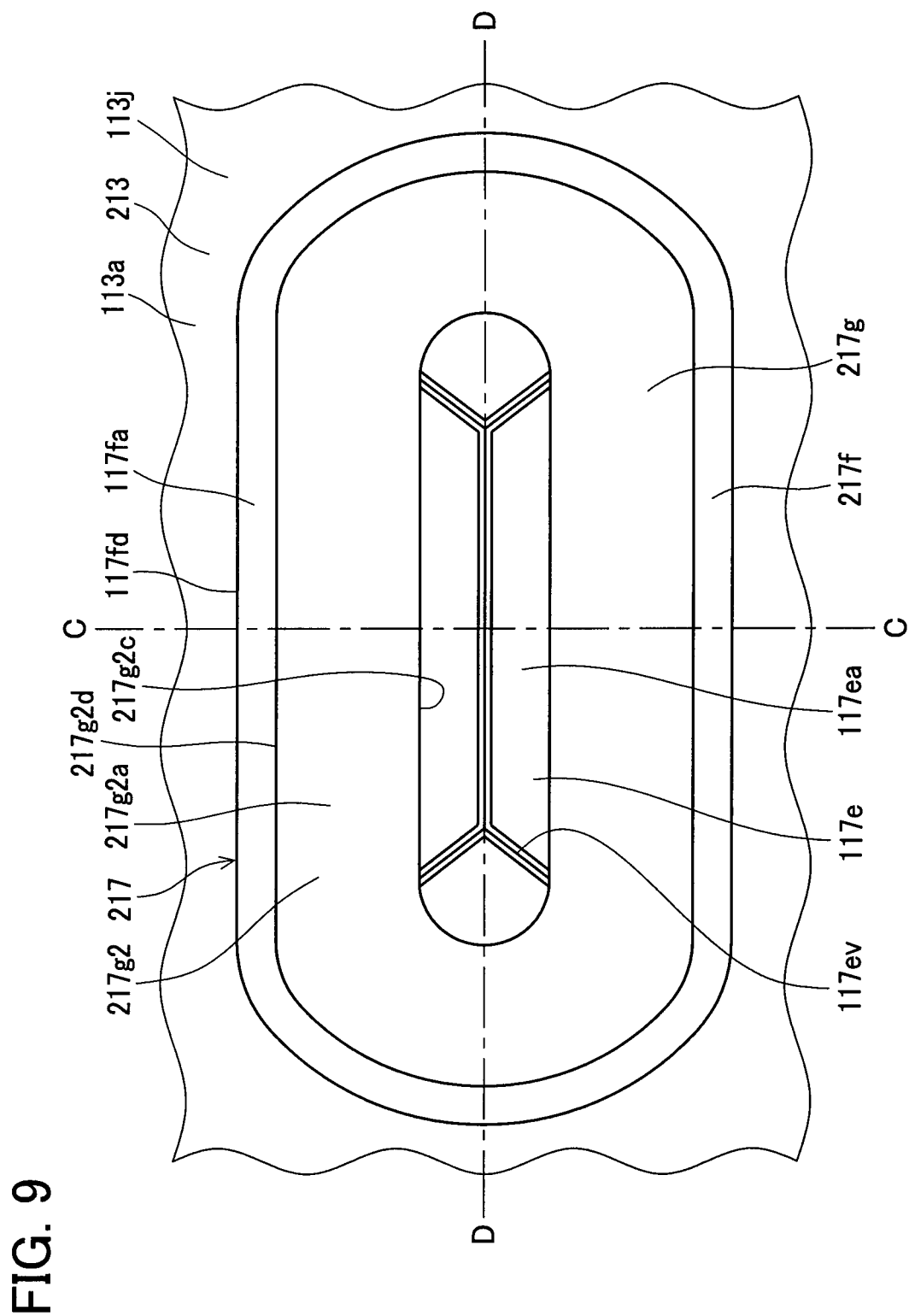
FIG. 9 is an enlarged plan view showing a safety valve and its vicinity in a lithium secondary battery of a second embodiment.
Figure 10:
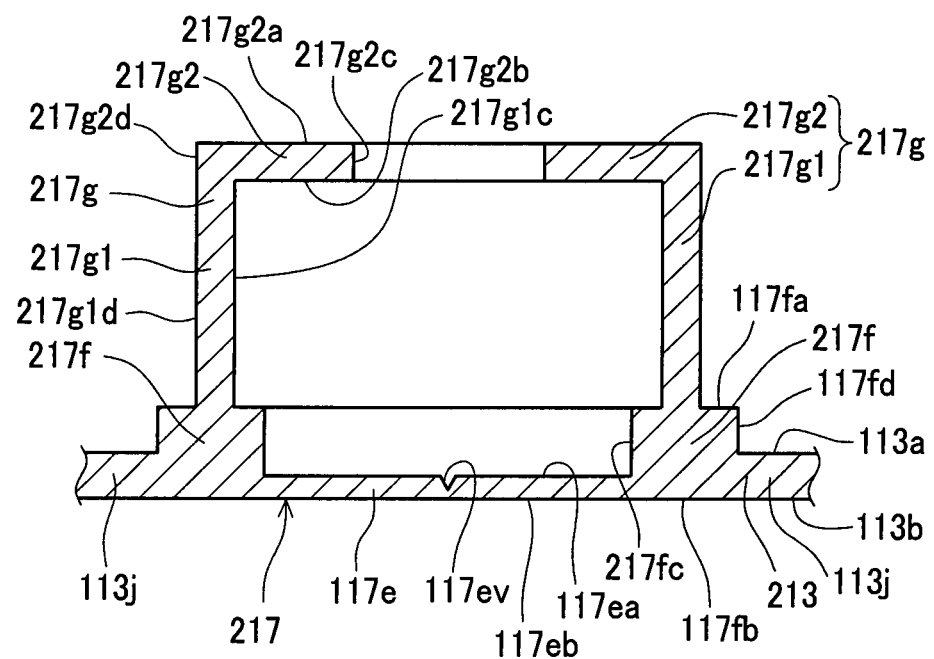
FIG. 10 is a cross sectional view of the safety valve of the lithium secondary battery of the second embodiment, taken along a line C-C in FIG. 9.
Figure 11:
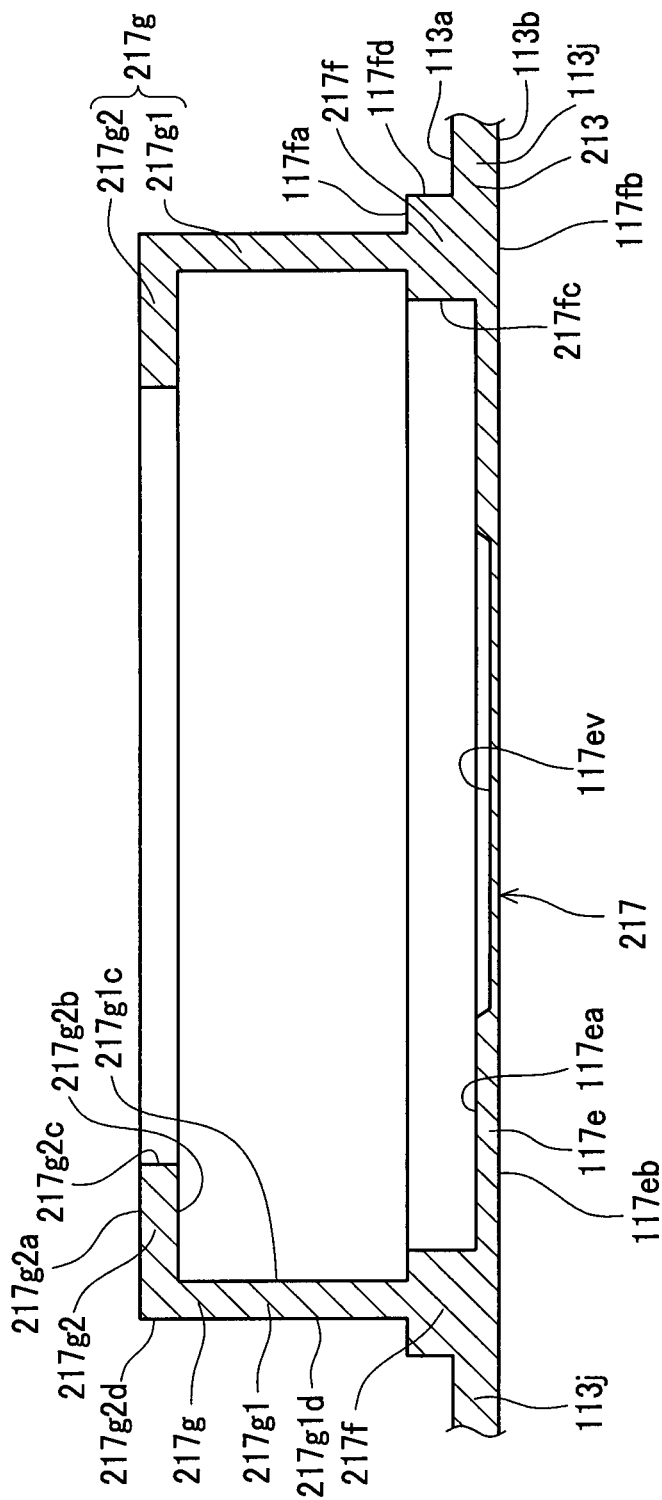
FIG. 11 is a cross sectional view of the safety valve of the lithium secondary battery of the second embodiment, taken along a line D-D in FIG. 9.

A second embodiment will be described. A lithium secondary battery 200 of the second embodiment includes a safety valve 217 different from the safety valve 117 of the first embodiment. Further points are substantially identical to those of the first embodiment. Such identical points are omitted or are briefly mentioned. FIGS. 9 to 11 show the details of the safety valve 217 of the second embodiment.

The safety valve 217 of the second embodiment is, as in the first embodiment, integrally provided in a case lid 213 at the center of its longitudinal direction. The safety valve 217 has an elliptic shape in plan view (see FIG. 9). This safety valve 217 includes a valve part 117e designed to rupture or cleave when the valve opens, a valve surrounding part 217f provided around the valve part 117e, and a scattering-range restricting cap part (a scattering-range restricting part) 217g provided on the valve surrounding part 217f. Those valve part 117e, valve surrounding part 217f, and cap part 217g are integrally formed. The scattering-range restricting cap part 217g corresponds to anti-scattering means of the invention.

The valve part 117e has the same configuration as in the first embodiment.

The valve surrounding part 217f has a ring shape including an upper surface 117fa, an under surface 117fb, an inner peripheral surface 217fc, and an outer peripheral surface 117fd. Those upper surface 117fa, under surface 117fb, and outer peripheral surface 117fd are identical to those of the valve surrounding part 117f of the first embodiment. In the first embodiment, the inner peripheral surface 117fc of the valve surrounding part 117f is slanted radially inward. In the second embodiment, on the other hand, the inner peripheral surface 217fc of the valve surrounding part 217f is perpendicular to the upper surface 113a and under surface 113b of the lid 213, the upper surface 117ea and under surface 117eb of the valve part 117e, and the upper surface 117fa and the under surface 117fb of the valve surrounding part 217f.

The scattering-range restricting cap part 217g is provided to protrude upward from the valve surrounding part 217f and constituted of a side wall 217g1 and an upper wall 217g2.

The side wall 217g1 includes an inner peripheral surface 217g1c and an outer peripheral surface 217g1d and has an elliptic ring shape in plan view. This side wall 217g1 is a wall extending upward from the upper surface 117fa of the valve surrounding part 217f. The side wall 217g1 has a narrower width than the valve surrounding part 217f in plan view. The inner peripheral surface 217g1c of the side wall 217g1 is located radially outside the inner peripheral surface 217fc of the valve surrounding part 217f and the outer peripheral surface 217g1d of the side wall 217g1 is located radially inside the outer peripheral surface 117fd of the valve surrounding part 217f.

The upper wall 217g2 includes an upper surface 217g2a, an under surface 217g2b, an inner peripheral surface 217g2c, and an outer peripheral surface 217g2d and has an elliptic ring shape in plan view. This upper wall 217g2 is continuous to an upper end of the side wall 217g1 and extends radially inward from the side wall 217g1. The outer peripheral surface 217g2d of the upper wall 218g and the outer peripheral surface 117fd of the valve surrounding part 217f are continuous and flush with each other.

Even when the broken portions 117ex of the ruptured valve part 117e fragment or break apart as fragmented broken-portions (fragments) 117ez from the valve surrounding part 217f when the valve opens, the scattering-range restricting cap part 217g blocks such fragments 117ez from scattering to the outside of the lithium secondary battery 200, as described later. To be concrete, this cap part 217g is a scattering-range restricting part to restrict a scattering range of the fragments 117ez when the valve opens, as mentioned later, and is placed on scattering paths of the fragments 117ez to prevent the fragments 117ez from scattering out of the cap part 217g itself.

Figure 12:
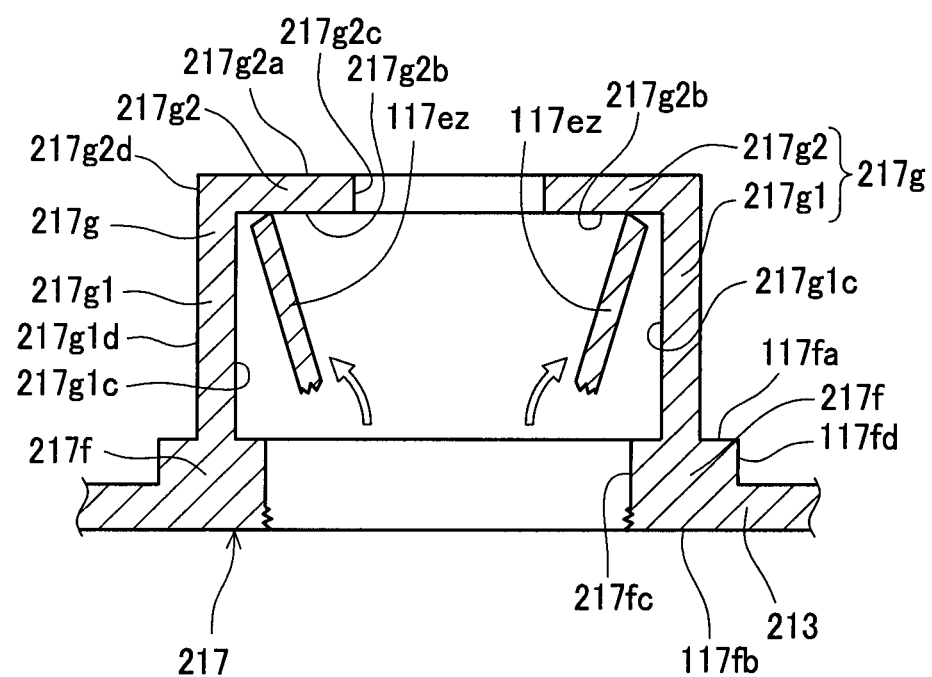
FIG. 12 is an explanatory view for the lithium secondary battery of the second embodiment, showing an opened state of the safety valve, in the cross sectional view along the line C-C in FIG. 9.
Figure 13:
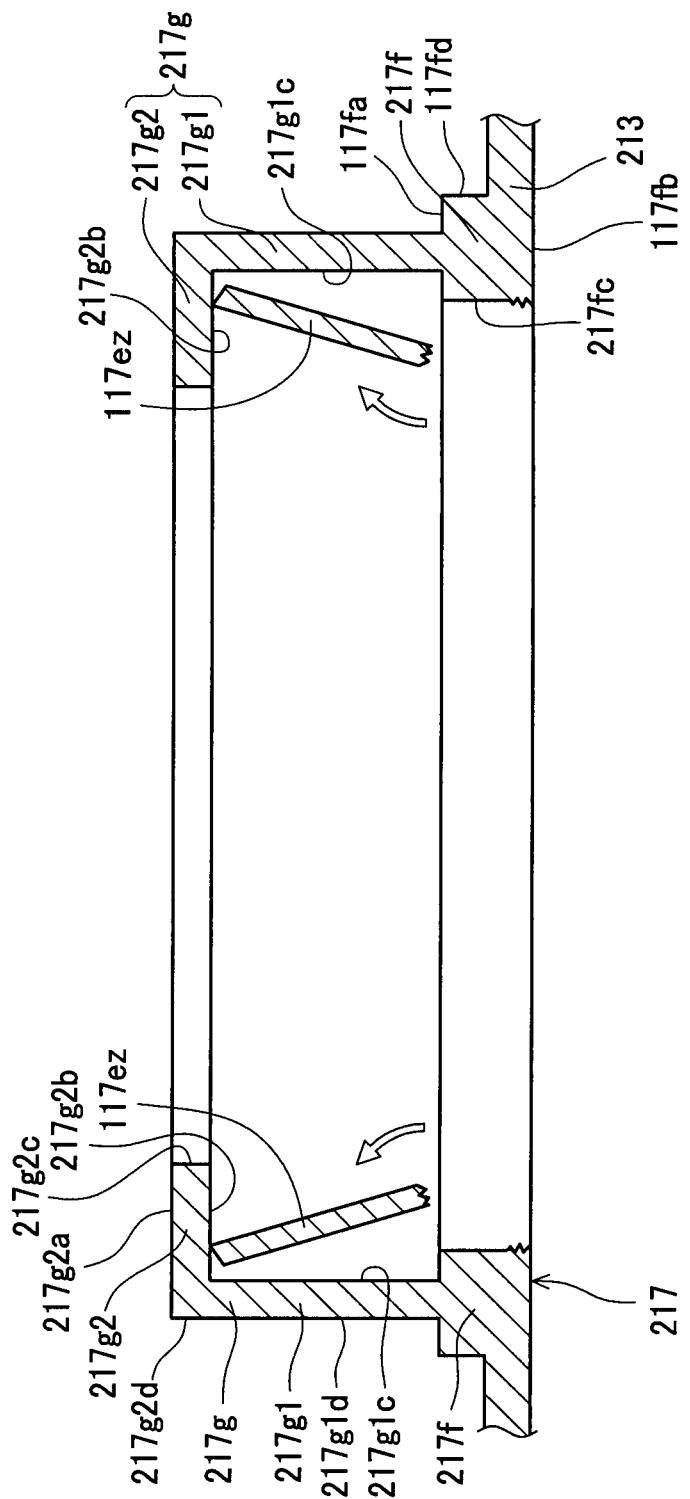
FIG. 13 is an explanatory view for the lithium secondary battery of the second embodiment, showing the opened state of the safety valve, in the cross sectional view along the line D-D in FIG. 9.

Such a safety valve 217 operates to open when the internal pressure of the battery case 110 reaches a predetermined pressure (see FIGS. 12 and 13). That is, when the internal pressure reaches the predetermined pressure, the valve part 117e will start to rupture or cleave from the groove portion 117ev, allowing the release of internal gas to the outside of the battery. When the valve part 117e is ruptured, the valve part 117e is cleaved upward and split into four broken portions 117ex.

In the second embodiment, furthermore, there is a case where those broken portions 117ex are fragmented or broken apart from the valve surrounding part 217f and resultant fragments 117ez try to scatter out of the battery. However, all of the fragments 117ez will collide against the inner wall of the cap part 217g (specifically, the inner peripheral surface 217g1c of the side wall 217g1 and the under surface 217g2b of the upper wall 217g2), so that the fragments 117ez are blocked from scattering beyond the cap part 217g to the outside thereof. Consequently, all the broken portions 117ex (the fragments 117ez) generated when the valve opens will not scatter to the outside of the lithium secondary battery 200.

As explained above, the lithium secondary battery 200 of the second embodiment includes the scattering-range restricting cap part 217g to prevent the broken portions 117ex generated by rupture or cleavage of the valve part 117e when the safety valve 217 is opened from scattering to the outside of the lithium secondary battery 200. This cap part 217g is placed on the scattering paths of the fragments 117ez and configured to prevent the fragments 117ez from scattering to the outside of the cap part 217g itself. Accordingly, even when the fragments 117ez are generated from the broken portions 117ex, such fragments 117ez are prevented from scattering to the outside of the battery.

Accordingly, it is possible to prevent such defects as breakage of the peripheral components due to the fragments 117ez. In addition, since the cap part 217g is provided on the valve surrounding part 217f of the safety valve 217 to constitute a part of the safety valve 217, the size of the entire safety valve 217 can be reduced without a decrease in the opening area of the valve part 117e when opened, as compared with a configuration that for example an upper side of a safety valve 217 is covered with a large cap. Thus, the lithium secondary battery 200 can also be compact. Moreover, the identical components or parts to those of the first embodiment can provide the same operations and advantages as those in the first embodiment.

Embodiment 3

Figure 14:
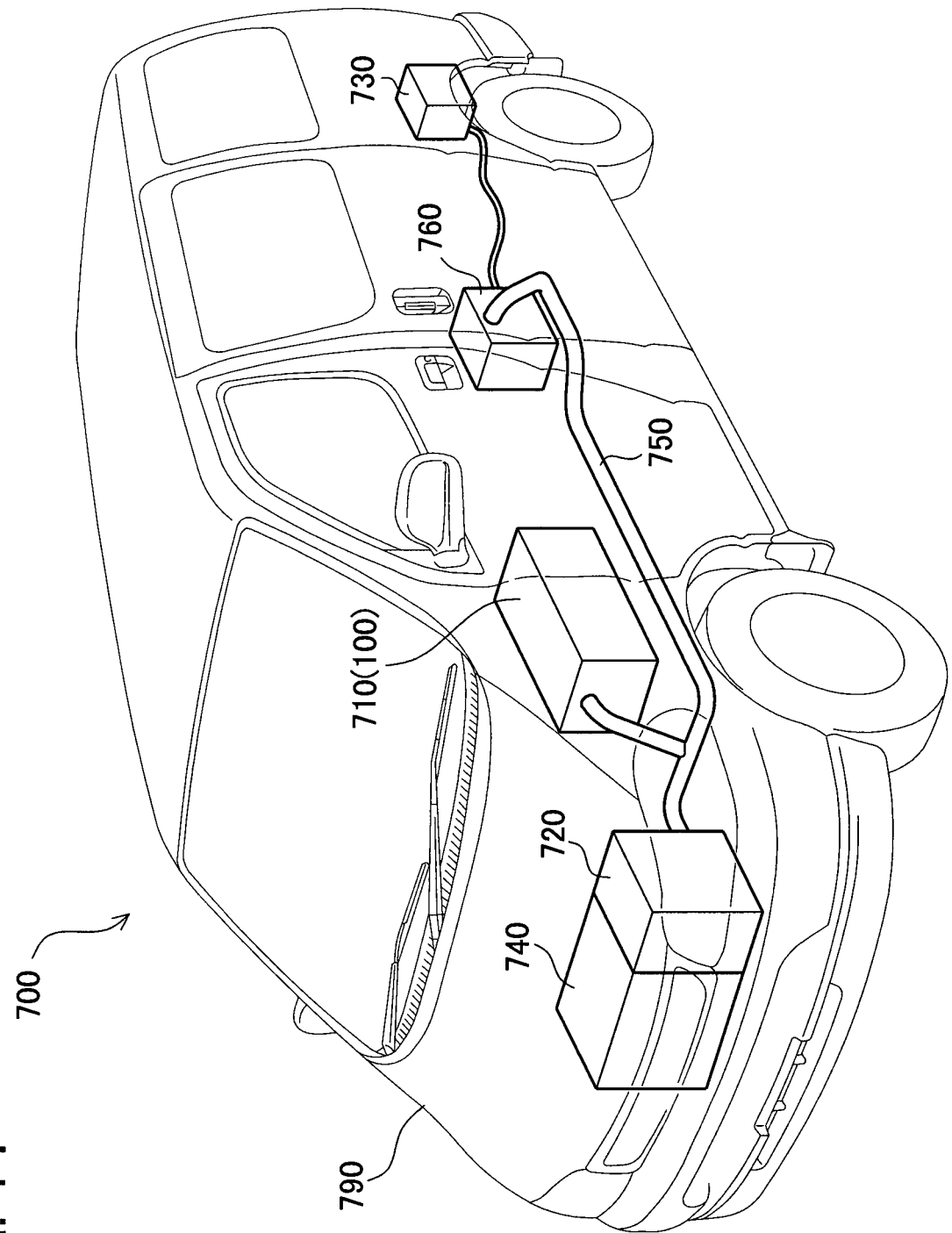
FIG. 14 is an explanatory view showing a vehicle of a third embodiment.

A third embodiment will be described below. A vehicle 700 of the third embodiment includes a plurality of the lithium secondary batteries (batteries) 100 of the first embodiment. To be specific, as shown in FIG. 14, the vehicle 700 is a hybrid electric vehicle to be driven by using an engine 740, a front motor 720, and a rear motor 730 in combination. This vehicle 700 includes a vehicle body 790, the engine 740, the front motor 720 attached to the engine 740, the rear motor 730, a cable 750, and an inverter 760. The vehicle 700 further includes a battery assembly 710 internally containing the lithium secondary batteries 100 to utilize the electric energy of the battery assembly 710 to drive the front motor 720 and the rear motor 730.

The lithium secondary battery 100 can prevent such defects as breakage of the surrounding components due to the broken portions 117ex generated when the valve opens, as described above. In the third embodiment, in particular, the plurality of lithium secondary batteries 100 are arranged side by side. This may cause a short circuit in the adjacent lithium secondary battery 100 itself or between the adjacently arranged lithium secondary batteries 100. However, each lithium secondary battery 100 is configured to reliably prevent the broken portions 117ex generated when the valve opens from scattering out of the battery. Thus, the lithium secondary battery 100 can reliably prevent the occurrence of such a short circuit. Consequently, the vehicle 700 equipped with such lithium secondary batteries 100 can provide improved reliability.

Embodiment 4

Figure 15:
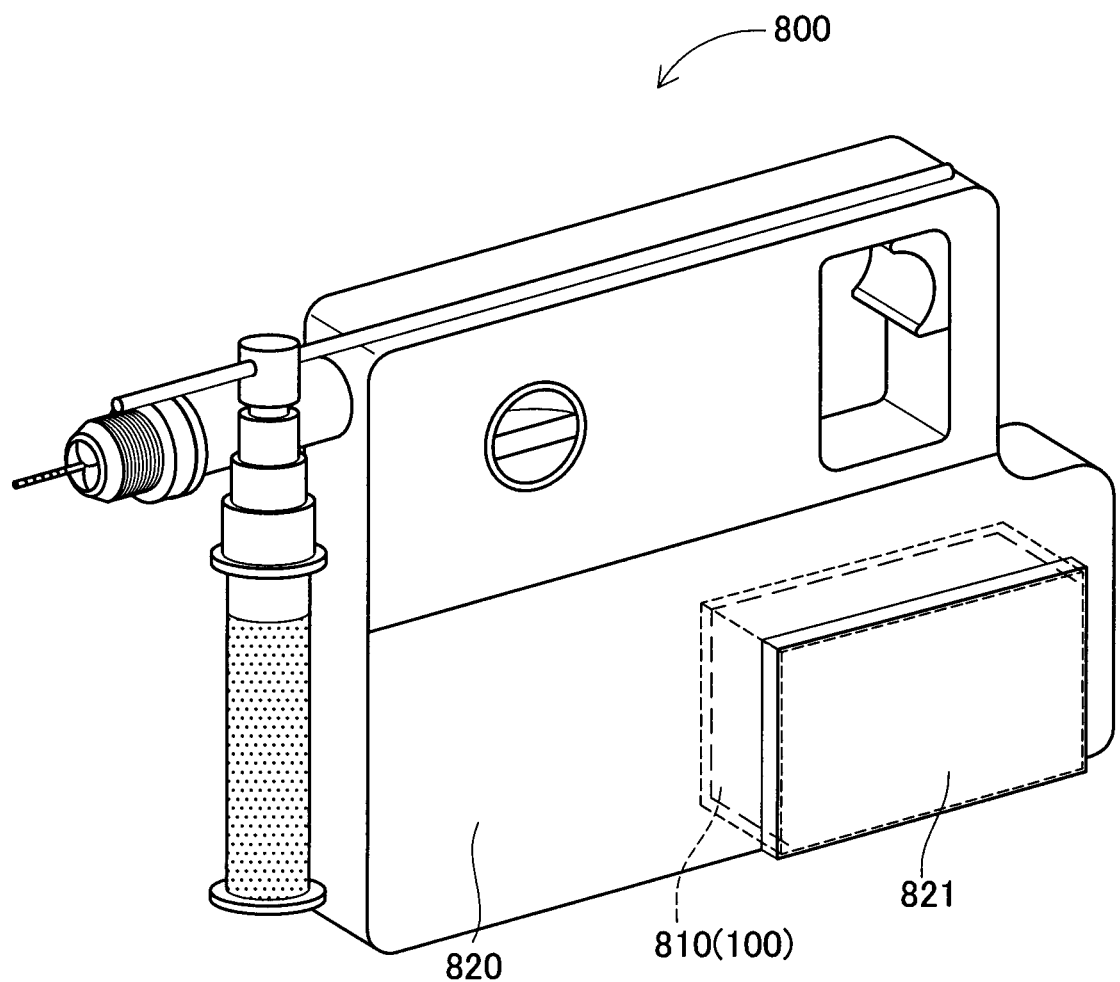
FIG. 15 is an explanatory view showing a hammer drill of a fourth embodiment.
Figure 16:
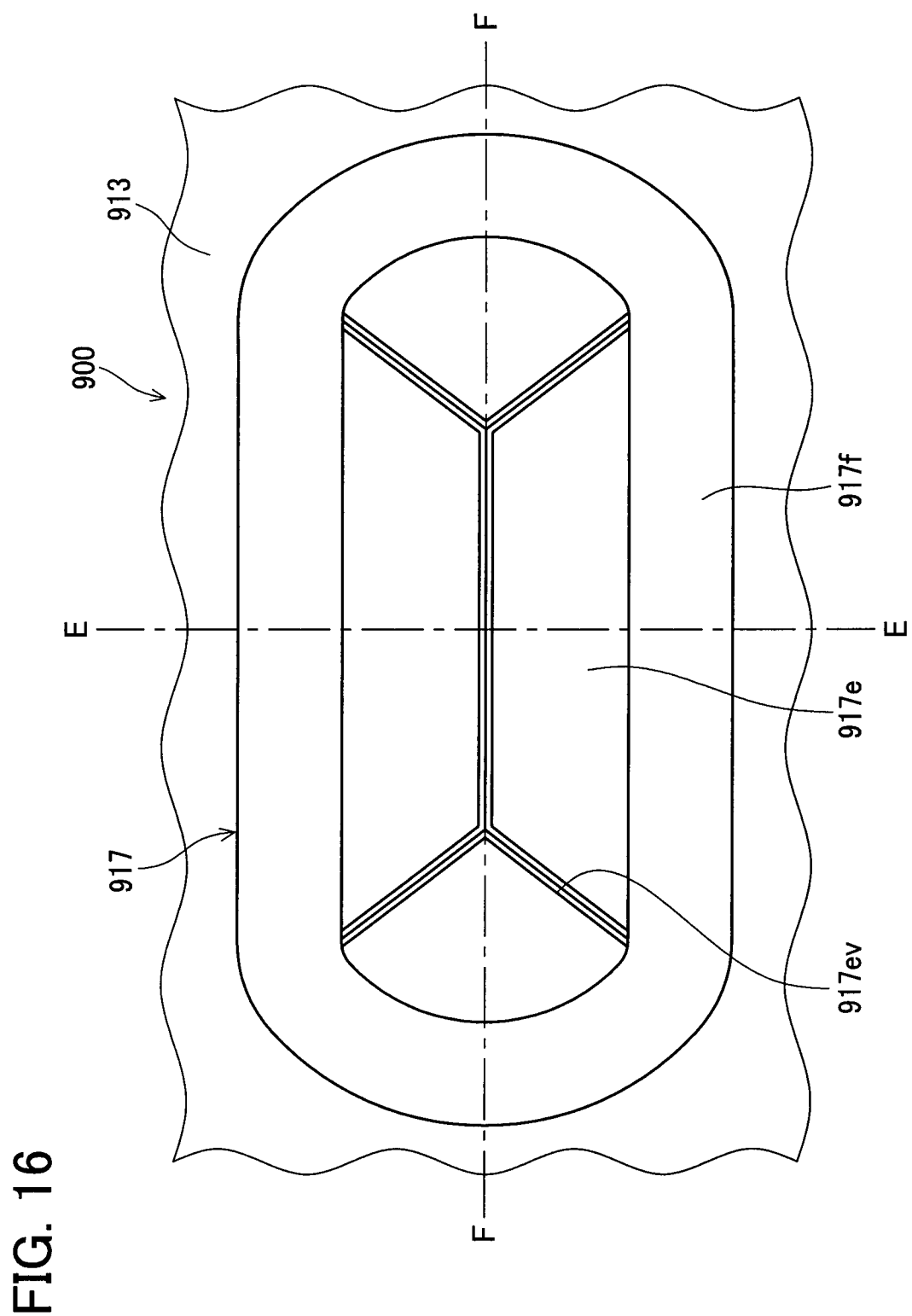
FIG. 16 is an enlarged plan view showing a safety valve and its vicinity in a conventional battery.
Figure 17:
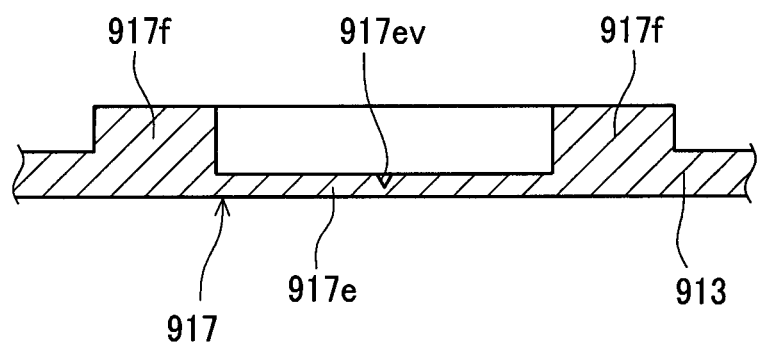
FIG. 17 is a cross sectional view of the safety valve of the conventional battery, taken along a line E-E in FIG. 16.
Figure 18:
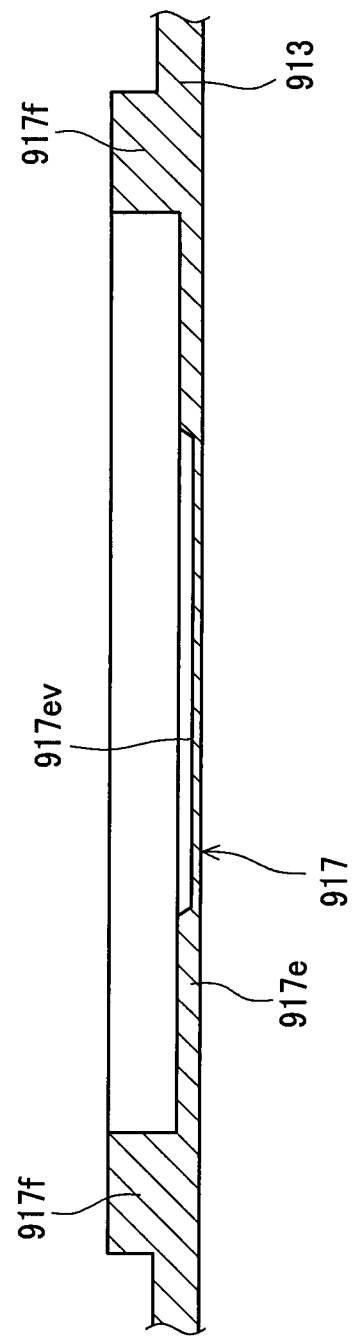
FIG. 18 is a cross sectional view of the safety valve of the conventional battery, taken along a line F-F in FIG. 16.
Figure 19:
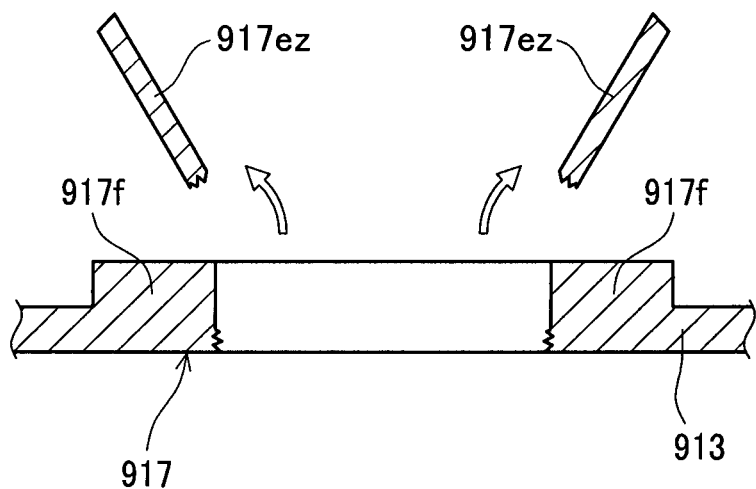
FIG. 19 is an explanatory view for the conventional battery, showing an opened state of the safety valve, in the cross sectional view along the line E-E in FIG. 16.
Figure 20:
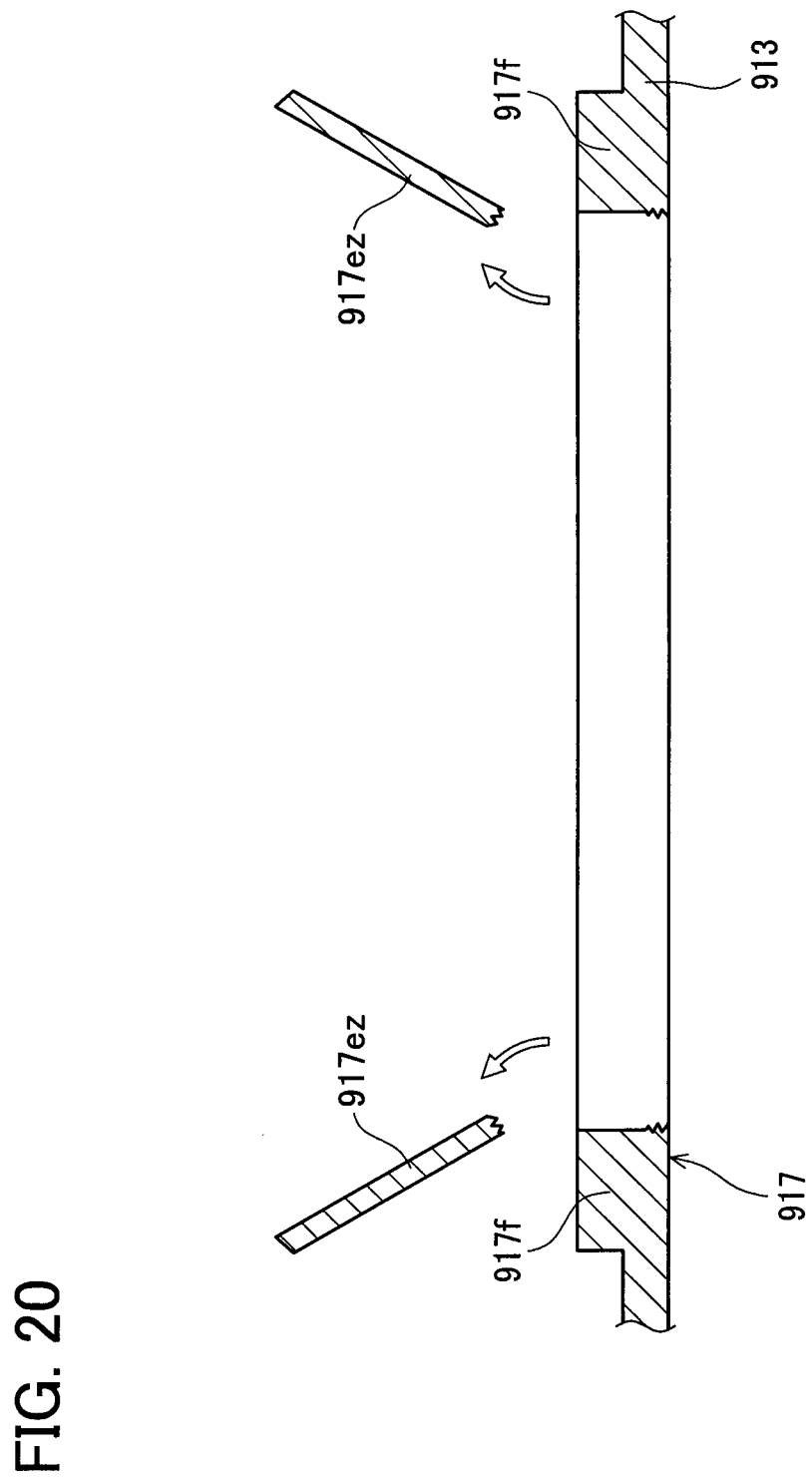
FIG. 20 is an explanatory view for the conventional battery, showing the opened state of the safety valve, in the cross sectional view along the line F-F in FIG. 16.

A fourth embodiment will be described below. A hammer drill of the fourth embodiment is a battery-operated equipment including a battery pack 810 containing the lithium secondary battery (battery) 100 of the first embodiment. As shown in FIG. 15, this hammer drill 800 is configured such that the battery pack 810 is housed in a bottom 821 of a main body 820. This battery pack 810 is used as an energy source to drive the drill 800.

As described above, the lithium secondary battery 100 can prevent such defects as breakage of the peripheral components due to the broken portions 117ex generated when the valve opens. Consequently, the hammer drill 800 equipped with the lithium secondary battery 100 can provide improved reliability.

The present invention is explained as above in the embodiments 1 to 4 but is not limited thereto. The invention may be embodied in other specific forms without departing from the essential characteristics thereof.

For instance, in the above embodiments 1 to 4, the battery is exemplified in the form of the lithium secondary batteries 100 and 200. The invention can also be applied to other types of secondary batteries such as a nickel hydride battery and a nickel cadmium battery.

The aforementioned embodiments 1 to 4 exemplify the lithium secondary batteries 100 and 200 in the form of a rectangular battery. As an alternative, the invention may also be applied to a cylindrical battery and others.

The aforementioned embodiments 1 to 4 exemplify the batteries 100 and 200 with a wound type power generating element (the electrode body 120). As an alternative, the invention may also be applied to a battery with a laminated type power generating element.

In the aforementioned embodiments 1 to 4, the valve surrounding part 117f or 217f and the anti-scattering means 117g or 217g are integrally formed. Alternatively, the valve surrounding part 117f or 217f and the anti-scattering means 117g or 217g may be made separately and joined together by welding or the like.

The invention claimed is:

1. A battery comprising a non-recovering safety valve including a valve part configured to be ruptured when the valve opens and a valve surrounding part provided around the valve part, the battery comprising
    an anti-fragmentation part provided in the valve surrounding part to constitute a part of the safety valve and configured to prevent a broken portion generated by rupture of the valve part from fragmenting from the valve surrounding part when the valve opens, the broken portion being integrally formed with the valve surrounding part,
    wherein the anti-fragmentation part is configured to allow the broken portion generated when the valve opens to come into contact with the anti-fragmentation part above the valve part to restrict deformation of the broken portion.

2. The battery according to claim 1, wherein
    the anti-fragmentation part includes a surface located above the valve part and located more inward on an upper side than on a lower side, the surface being configured to allow the broken portion to come into contact with the surface to restrict deformation of the broken portion.

3. The battery according to claim 1, wherein the anti-fragmentation part is integrally formed with the valve surrounding part.

4. A vehicle equipped with the battery according to claim 1, the vehicle using electric energy of the battery as all or part of a power source.

5. A battery-operated equipment equipped with the battery according to claim 1, the device using the energy as at least one of energy sources.

6. The battery according to claim 2, wherein the anti-fragmentation part is integrally formed with the valve surrounding part.

7. A vehicle equipped with the battery according to claim 2, the vehicle using electric energy of the battery as all or part of a power source.

8. A vehicle equipped with the battery according to claim 3, the vehicle using electric energy of the battery as all or part of a power source.

9. A vehicle equipped with the battery according to claim 6, the vehicle using electric energy of the battery as all or part of a power source.

10. A battery-operated equipment equipped with the battery according to claim 2, the device using the energy as at least one of energy sources.

11. A battery-operated equipment equipped with the battery according to claim 3, the device using the energy as at least one of energy sources.

12. A battery-operated equipment equipped with the battery according to claim 6, the device using the energy as at least one of energy sources.

* * * * *